(12) United States Patent
Lin (10) Patent No.: US 9,274,567 B2
(45) Date of Patent: Mar. 1, 2016

(54) PORTABLE ELECTRONIC DEVICE AND CONTROL METHOD THEREOF

(71) Applicants: Qisda (Suzhou) Co., Ltd., Suzhou (CN); Qisda Corporation, Taoyuan (TW)

(72) Inventor: Feng Chou Lin, Taoyuan (TW)

(73) Assignees: QISDA (SUZHOU) CO., LTD., Suzhou (CN); QISDA CORPORATION, Taoyuan (TW)

( * ) Notice: Subject to any disclaimer, the term of this patent is extended or adjusted under 35 U.S.C. 154(b) by 0 days.

(21) Appl. No.: 14/608,172

(22) Filed: Jan. 28, 2015

(65) Prior Publication Data

US 2015/0253817 A1    Sep. 10, 2015

(30) Foreign Application Priority Data

Mar. 5, 2014    (TW) ............... 103107376 A (51) Int. Cl.
*G06K 5/00* (2006.01)
*G06F 1/16* (2006.01)
*G06F 3/01* (2006.01)

(52) U.S. Cl.
CPC ............... *G06F 1/1694* (2013.01); *G06F 3/01* (2013.01); *G06F 2200/1614* (2013.01); *G06F 2200/1637* (2013.01)

(58) Field of Classification Search
CPC ............. G06K 5/00; G06K 7/10; G06K 9/22; G06F 17/00
USPC ................ 235/380, 375, 462.45, 472.01
See application file for complete search history.

(56) References Cited

U.S. PATENT DOCUMENTS

| 2012/0309412 A1* | 12/2012 | MacGougan | G06F 3/0346 455/456.1 |
| 2015/0116363 A1* | 4/2015 | Monte | G06T 3/60 345/659 |

* cited by examiner

*Primary Examiner* — Edwyn Labaze
(74) *Attorney, Agent, or Firm* — Ding Yu Tan (57) ABSTRACT

A portable electronic device is provided. The portable electronic device includes a display module, a speed sensor and a control module. The display module is for displaying an image. The speed sensor is for determining a moving speed of the portable electronic device. The control module, coupled to the speed sensor and the display module, is for determining a rotation sensitivity for the control module to rotate the displayed image according to the moving speed of the portable electronic device. A control method of the aforementioned portable electronic device is also provided.

15 Claims, 9 Drawing Sheets

PORTABLE ELECTRONIC DEVICE AND CONTROL METHOD THEREOF

FIELD OF THE INVENTION

The present invention relates to a control method of image displaying, and more particularly to portable electronic device and control method thereof capable of controlling the rotation sensitivity of the displaying images of portable electronic device.

BACKGROUND OF THE INVENTION

With the development of technology, more and more various portable electronic devices (such as smart phones or tablet computers) are equipped with a g-sensor for sensing the change of rotating angle of the portable electronic device itself. Specifically, if the change of rotating angle is greater than a predetermined value, the portable electronic device automatically rotates the displaying image 90 degrees, so that a user can watch or view the image more comfortable and convenient.

However, a user may have various motion states and usage modes while watching or viewing the images displayed by the portable electronic device, thus, the displaying image may have too high or too low rotation sensitivity if the rotation mechanism for rotating the displaying image is determined only based on the sensing result of the g-sensor. In other words, when the user sits down and uses the portable electronic device, the portable electronic device may not automatically rotate the image when the image is needed to be rotated. Or, when the user walks and uses the portable electronic device, the portable electronic device may automatically rotate the image when the image should not be rotated. Consequentially, it is quite inconvenient and uncomfortable for a user while using the portable electronic device to watch or view images.

SUMMARY OF THE INVENTION

Therefore, one object of the present invention is to provide portable electronic device and control method thereof capable of solving the aforementioned problems in prior art.

The present invention provides a portable electronic device, which includes a display module, a speed sensor and a control module. The display module is for displaying an image. The speed sensor is for determining a moving speed of the portable electronic device. The control module, coupled to the speed sensor and the display module, is for determining a rotation sensitivity for the control module to rotate the displayed image according to the moving speed of the portable electronic device.

In one embodiment, the control module rotates the displayed image with a first rotation sensitivity when the moving speed of the portable electronic device is higher than a first speed and lower than a second speed.

In one embodiment, the portable electronic device further includes a distance sensor and an angle sensor. The distance sensor, coupled to the control module, is for determining a distance change between an object and the portable electronic device. The angle sensor, coupled to the control module, is for determining an angle of the portable electronic device with respect to a reference direction. The angle is corresponding to the user's viewing direction and the display surface of the portable electronic device. When the moving speed of the portable electronic device is lower than the first speed or higher than the second speed, the control module determines the rotation sensitivity according to the distance change and the angle.

In one embodiment, when the moving speed is lower than the first speed, the control module rotates the displayed image with a second rotation sensitivity if the angle is nonzero and the distance change is smaller than a predetermined value, wherein the second rotation sensitivity is higher than the first rotation sensitivity In one embodiment, the control module switches the portable electronic device to a first mode when the angle is smaller than or equal to a predetermined angle, when the angle is greater than the predetermined angle, the control module switches the portable electronic device to a second mode.

In one embodiment, when the moving speed of the portable electronic device is higher than the second speed, the control module rotates the displayed image with a second rotation sensitivity if the angle is nonzero and the distance change is smaller than a predetermined value, wherein the second rotation sensitivity is higher than the first rotation sensitivity.

In one embodiment, the control module switches the portable electronic device to a first mode when the angle is smaller than or equal to a predetermined angle, when the angle is greater than the predetermined angle, the control module switches the portable electronic device to a second mode.

In one embodiment, when the moving speed of the portable electronic device is zero, the control module rotates the displayed image with a third rotation sensitivity if the angle is nonzero, wherein the third rotation sensitivity is higher than the second rotation sensitivity.

In one embodiment, the distance sensor includes a first ultrasonic emitting unit, a second ultrasonic emitting unit, a first ultrasonic receiving unit and a second ultrasonic receiving unit. The first ultrasonic emitting unit, disposed on a front surface of the portable electronic device, is for emitting a first ultrasonic emission signal from the front surface of the portable electronic device. The second ultrasonic emitting unit, disposed on a back surface of the portable electronic device, is for emitting a second ultrasonic emission signal from the back surface of the portable electronic device. The first ultrasonic receiving unit is for receiving a first ultrasonic reflection signal formed by the reflected first ultrasonic emitting signal and accordingly obtaining a front-image state. The second ultrasonic receiving unit is for receiving a second ultrasonic reflection signal formed by the reflected second ultrasonic emitting signal and accordingly obtaining a back-image state.

In one embodiment, the control module further includes a human feature recognition unit, which is coupled to the first ultrasonic receiving unit and for determining whether there exists a human figure in the front-image state according to a predetermined human feature. The control module controls the image not to rotate if it is determined that there is no human figure in the front-image state.

The present invention further provides a control method of a portable electronic device. The control method includes steps of: (a) controlling the portable electronic device to display an image; (b) determining a moving speed of the portable electronic device; and (c) determining a rotation sensitivity for the portable electronic device to rotate the displayed image according to the moving speed.

In summary, compared with the prior art, the portable electronic device and the control method thereof of the present invention can automatically adjust the rotation sensitivity of the image being displayed by the portable electronic device according to the motion state and using mode of a user.

Thus, the requirements of users watching or viewing the portable electronic device under various motion states and using modes are satisfied. In addition, because the rotation sensitivity is properly adjusted, a too high/low rotation sensitivity is avoided and a user is prevented from having to manually adjust the angle of the portable electronic device while watching or viewing the portable electronic device. For making the above and other purposes, features and benefits become more readily apparent to those ordinarily skilled in the art, the preferred embodiments and the detailed descriptions with accompanying drawings will be put forward in the following descriptions.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

A portable electronic device is provided according to a preferred embodiment of the present invention. In a practical application, the portable electronic device may be a smart phone, tablet computer or any other types of electronic devices with image display function, and the present invention is not limited thereto.

Figure 1:
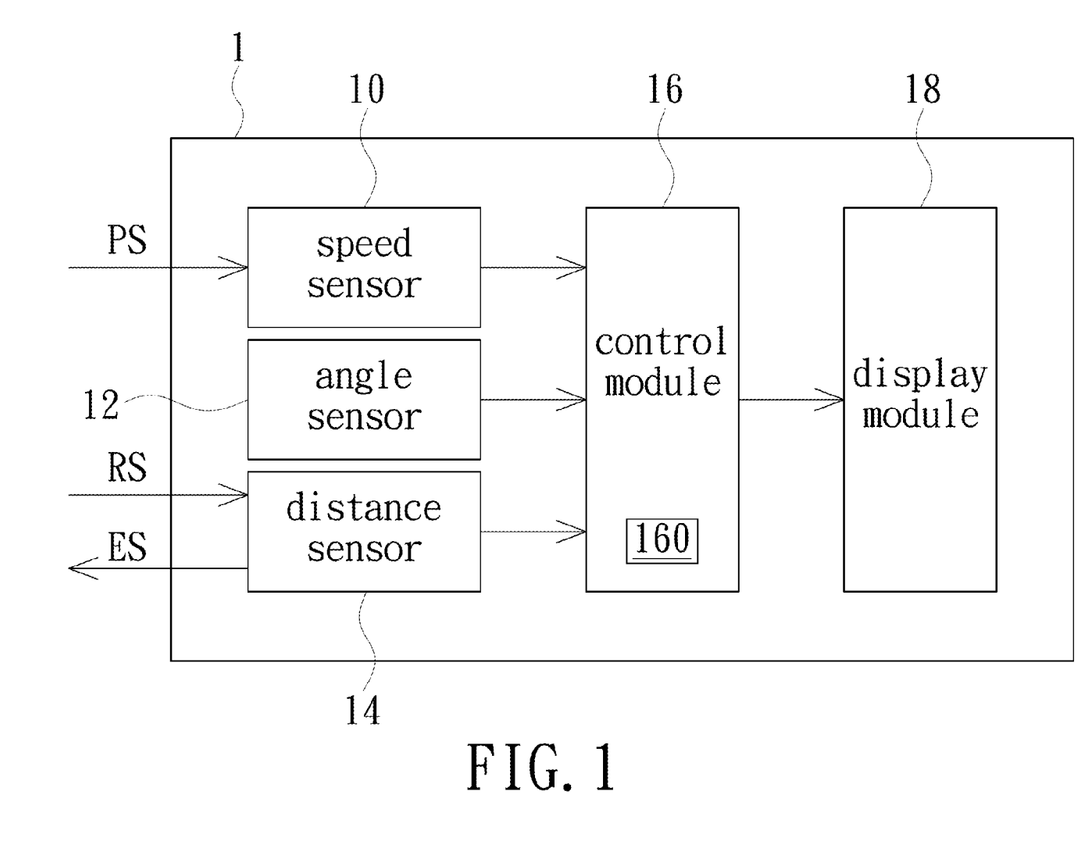
FIG. 1 is a functional block diagram of a portable electronic device in accordance with an embodiment of the present invention.

Please refer to FIG. 1, which is a functional block diagram of a portable electronic device in accordance with an embodiment of the present invention. As shown in FIG. 1, the portable electronic device 1 in the present embodiment includes a speed sensor 10, an angle sensor 12, a distance sensor 14, a control module 16 and a display module 18. The speed sensor 10, the angle sensor 12 and the distance sensor 14 are respectively coupled to the control module 16; and the control module 16 is coupled to the display module 18. The control module 16 includes a human feature recognition unit 160.

In the present embodiment, the display module 18 is a display panel for displaying images. Specifically, the display module 18 may be a liquid crystal display (LCD) panel; however, the present invention is not limited thereto.

The speed sensor 10 is for receiving a positioning signal PS (such as the global positioning system (GPS) signal, but the present invention is not limited thereto) at different times and determining a moving speed of the portable electronic device 1 according to the positioning signals PS thereof received at different times.

The control module 16 is for determining the rotation sensitivity of the images being displayed by the display module 18 according to the moving speed of the portable electronic device 1 determined by the speed sensor 10. In other words, the portable electronic device 1 can adjust the degree of the rotation sensitivity of the images being displayed by the display module 18 according to the moving speed of the portable electronic device 1 itself. The rotation sensitivity used in the control module 16 is for modifying the threshold for rotating the displayed image or adding time delay when decided to rotate the displayed image. The rotation sensitivity is higher, the control module 16 can to rotate the displayed image easier.

The distance sensor 14 is for determining a distance change between an object (not shown) and the portable electronic device 1. In the present embodiment, a distance sensing mechanism (not shown) of the distance sensor 14 is not limited. In one embodiment, for example, the distance sensor 14 may use optical or ultrasound mechanisms as being the distance sensing mechanism to measure the distance between an object and the portable electronic device 1 by emitting an emission signal ES and receiving a reflection signal RS which is derived from the emission signal ES and reflected by the object.

Figure 2A:
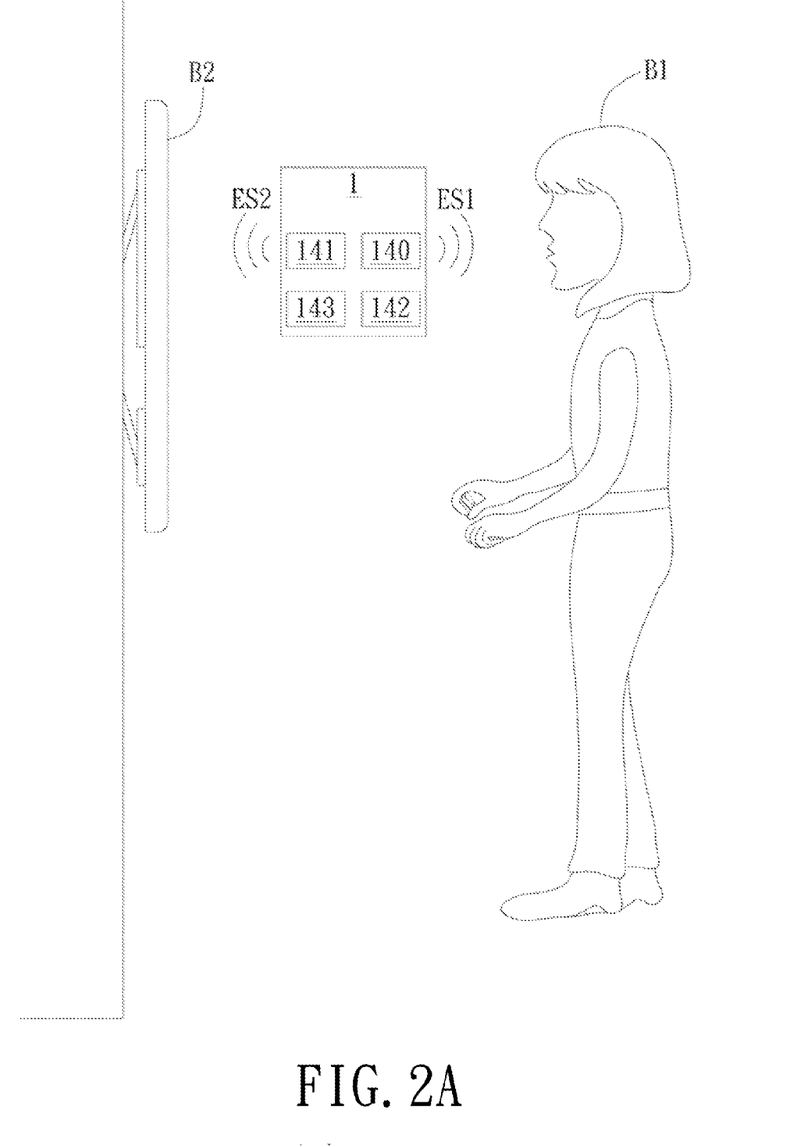
FIGS. 2A and 2B are schematic views of a portable electronic device equipped with a distance sensor adopting an ultrasound mechanism for the distance sensing.
Figure 2B:
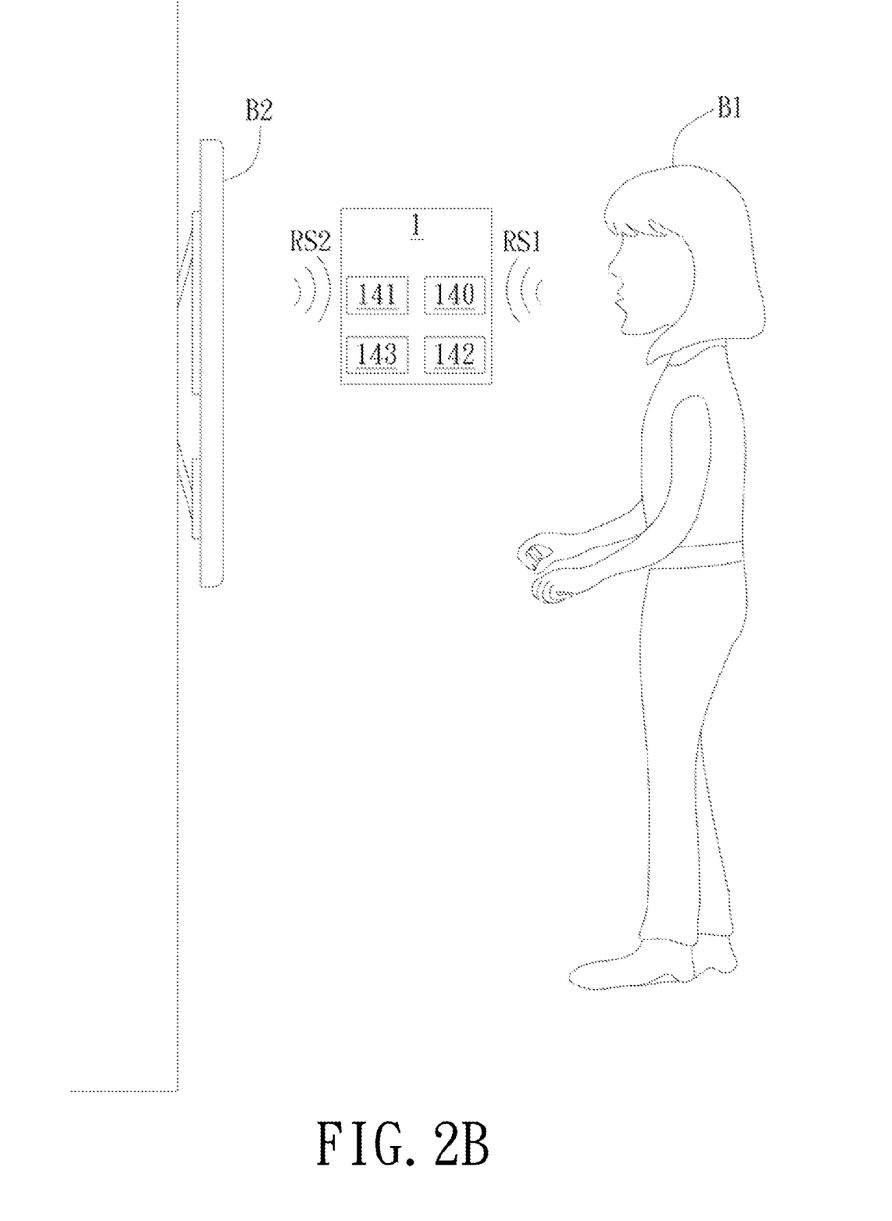

Specifically, if adopting the ultrasound mechanism for the distance sensing, the distance sensor 14 of the portable electronic device 1 may include a first ultrasonic emitting unit 140, a second ultrasonic emitting unit 141, a first ultrasonic receiving unit 142 and a second ultrasonic receiving unit 143, as shown in FIGS. 2A and 2B.

As shown in FIG. 2A, the first and second ultrasonic emitting units 140, 141 are disposed on the front and back surfaces of the portable electronic device 1 and for emitting the first and second ultrasonic emission signals ES1, ES2 from the front and back surfaces of the portable electronic device 1, respectively. In one embodiment, the first ultrasonic emitting unit 140, disposed on the front surface of the portable electronic device 1, may have an effective emitting distance about 1 meter and the second ultrasonic emitting unit 141, disposed on the back surface of the portable electronic device 1, may have an effective emitting distance about 10 meters; however, the present invention is not limited thereto.

In FIG. 2B, the first and second ultrasonic receiving units 142, 143 are for receiving the first and second ultrasonic reflection signals RS1, RS2 formed by the first and second ultrasonic emission signals ES1, ES2 reflected by a plurality of objects B1, B2, respectively. Thus, according to the first and second ultrasonic reflection signals RS1 and RS2, the portable electronic device 1 obtains the front-image and back-image states facing to the front and back surfaces of the portable electronic device 1, respectively.

In one embodiment, the first and second ultrasonic emission units 140, 141 may adopt array speakers to issue or send out the ultrasonic emission signals ES1, ES2, and correspondingly the first and second ultrasonic receiving units 142, 143 may adopt microphones to receive the ultrasonic reflection signals RS1, RS2, respectively; however, the present invention is not limited thereto.

The angle sensor 12 is for sensing an angle formed between the portable electronic device 1 and a reference direction (e.g., the horizontal direction). In one embodiment, the angle sensor 12 may adopt G-sensor or Gyro meter for the angle sensing; however, the present invention is not limited thereto.

According to the above descriptions, it is to be noted that besides of using the moving speed of the portable electronic device 1, determined by the speed sensor 10, to determine the rotation sensitivity of the image being displayed by the display module 18 of the portable electronic device 1, the control module 16 also adjusts the rotation sensitivity of the being-displayed image of the portable electronic device 1 according to the distance change between an object and the portable electronic device 1 as determined by the distance sensor 14, and the angle formed between the portable electronic device 1 and a horizontal direction as sensed by the angle sensor 12. In other words, the portable electronic device 1 can determine whether or not to rotate the image being displayed by its display module 18 according to some specific sensing results, including such as, the moving speed itself, the distance change between itself and an object and the angle formed between itself and the horizontal direction; however, the present invention is not limited thereto.

To get a better understanding of the present invention, the operation of the portable electronic device 1 will be described by some exemplary scenarios as follow.

In the first scenario, when the speed sensor 10 determines that the moving speed of the portable electronic device 1 is higher than a first speed (e.g., 5 km/h) and lower than a second speed (e.g., 15 km/h), it is determined that an user with the portable electronic device 1 is in a walking state due to the fact that the current moving speed of the portable electronic device 1 is substantially equal to the walking speed of an average person (e.g., 5 to 15 km/h). Thus, the portable electronic device 1 does not need to further determine as to whether the user is in sitting or lying down state, and the control module 16 directly uses a first rotation sensitivity (the lowest rotation sensitivity) to control the image being displayed by the display module 18 to rotate.

In the second scenario, when the speed sensor 10 determines that the moving speed of the portable electronic device 1 is lower than the first speed (e.g., 5 km/h) or higher than the second speed (e.g., 15 km/h), it is determined that the user with the portable electronic device 1 is in a non-walking state due to the fact that the current moving speed of the portable electronic device 1 is not substantially equal to the walking speed of the average person (e.g., 5 to 15 km/h). Thus, the control module 16 of the portable electronic device 1 needs to further determine the rotation sensitivity of the image being displayed by the display module 18 of the portable electronic device 1 according to some specific sensing results, such as, the distance change between an object and the portable electronic device 1 as determined by the distance sensor 14, and the angle formed between the portable electronic device 1 and a horizontal direction as sensed by the angle sensor 12.

For example, when the speed sensor 10 determines that the moving speed of the portable electronic device 1 is lower than the first speed (e.g., 5 km/h), it is determined that the user with the portable electronic device 1 may be taking a slow walk or on a vehicle with a relatively low speed. Thus, the control module 16 uses a second rotation sensitivity (i.e., a second high rotation sensitivity which is higher than the first rotation sensitivity) to control the image being displayed by the display module 18 to rotate if the angle sensor 12 senses that the angle formed between the portable electronic device 1 and a horizontal direction is nonzero and the distance sensor 14 determines that the distance change between an object and the portable electronic device 1 is smaller than a predetermined value.

Figure 3A:
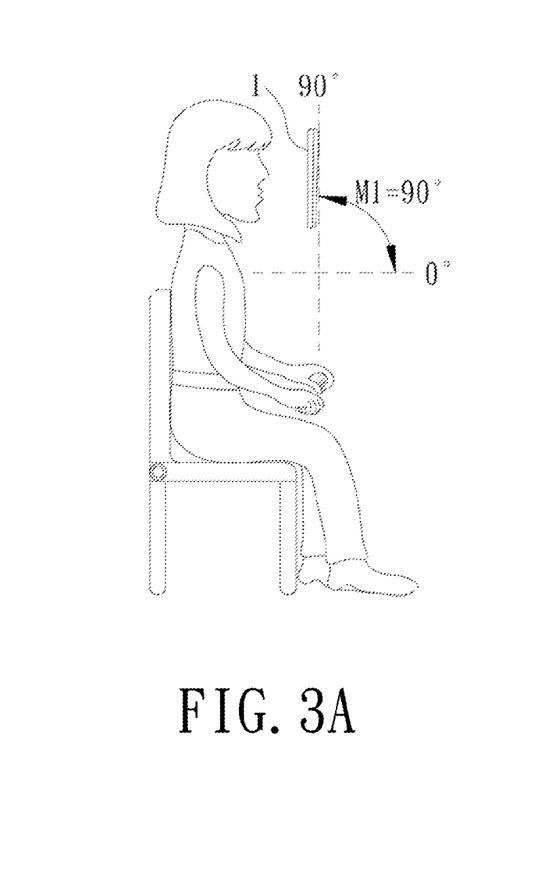
FIG. 3A is a schematic view of a portable electronic device having an angle equal to a predetermined angle (e.g., 90 degrees) relative to a horizontal direction.
Figure 3B:
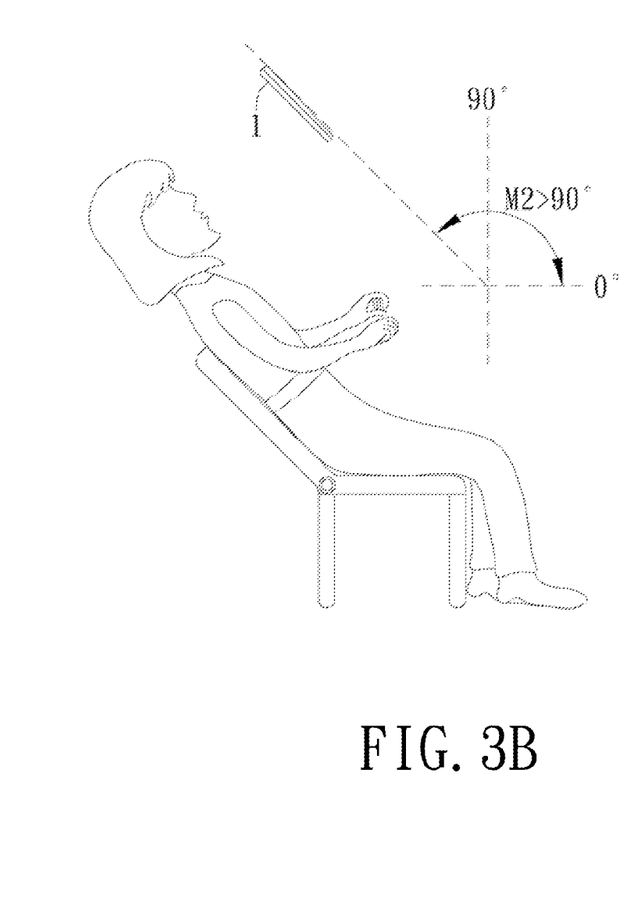
FIG. 3B is a schematic view of a portable electronic device having an angle greater than a predetermined angle (e.g., 90 degrees) relative to a horizontal direction.

Meanwhile, if the angle sensor 12 senses that the angle formed between the portable electronic device 1 and a horizontal direction is smaller than or equal to a predetermined angle (e.g., 90 degrees) as that of the angle M1=90 degrees as illustrated in FIG. 3A, the control module 16 switches the portable electronic device 1 to a first mode (e.g., a sitting mode). Alternatively, if the angle sensor 12 senses that the angle formed between the portable electronic device 1 and the horizontal direction is greater than a predetermined angle (e.g., 90 degrees) as that of the angle M2>90 degrees as illustrated in FIG. 3B, the control module 16 switches the portable electronic device 1 to a second mode (e.g., a lying down mode). The first mode and the second mode may have different settings, for example brightness, viewing angle, size of icons and so on. However, the present invention is not limited thereto.

Based on the same manner, when the speed sensor 10 determines that the moving speed of the portable electronic device 1 is higher than the second speed (e.g., 15 km/h), it is determined that the user with the portable electronic device 1 may be taking some specific transports. Thus, the control module 16 uses the second rotation sensitivity (i.e., the second rotation sensitivity which is higher than the first rotation sensitivity) to control the image being displayed by the display module 18 to rotate if the angle sensor 12 senses that the angle formed between the portable electronic device 1 and a horizontal direction is nonzero and the distance sensor 14 determines that the change of the distance between an object and the portable electronic device 1 is smaller than a predetermined value.

Meanwhile, if the angle sensor 12 senses that the angle formed between the portable electronic device 1 and a horizontal direction is smaller than or equal to a predetermined angle (e.g., 90 degrees) as that the angle M1=90 degrees illustrated in FIG. 3A, the control module 16 switches the portable electronic device 1 to the first mode (e.g., the sitting mode). Alternatively, if the angle sensor 12 senses that the angle formed between the portable electronic device 1 and the horizontal direction is greater than a predetermined angle (e.g., 90 degrees) as that of the angle M2>90 degrees as illustrated in FIG. 3B, the control module 16 switches the portable electronic device 1 to the second mode (e.g., the lying down mode). However, the present invention is not limited thereto.

In the third scenario, when the speed sensor 10 determines that the moving speed of the portable electronic device 1 is zero, it is determined that the user with the portable electronic device 1 is being still or stationary, without making a movement or is taking a still transport (which is not moving). Thus, the control module 16 uses the third rotation sensitivity (i.e., the highest rotation sensitivity which is higher than the second rotation sensitivity) to control the image being displayed by the display module 18 to rotate if the angle sensor 12 senses that the angle formed between the portable electronic device 1 and a horizontal direction is nonzero.

Meanwhile, if the angle sensor 12 senses that the angle formed between the portable electronic device 1 and a horizontal direction is smaller than or equal to a predetermined angle (e.g., 90 degrees) as that of the angle M1=90 degrees as illustrated in FIG. 3A, the control module 16 switches the portable electronic device 1 to the first mode (e.g., the sitting mode). Alternatively, if the angle sensor 12 senses that the angle formed between the portable electronic device 1 and the horizontal direction is greater than a predetermined angle (e.g., 90 degrees) as that the angle M2>90 degrees illustrated in FIG. 3B, the control module 16 switches the portable electronic device 1 to the second mode (e.g., the lying down mode). However, the present invention is not limited thereto.

To facilitate a better determination as to whether or not the user is watching and operating the portable electronic device 1, the control module 16 in the present embodiment may further include a human feature recognition unit 160. In one embodiment, when the distance sensor 14 adopts the ultrasound mechanism for the distance sensing, correspondingly the human feature recognition unit 160 may be coupled to the first ultrasonic receiving unit 142 and determining whether there exists a human figure in the front-image state according to a predetermined human feature.

Figure 4A:
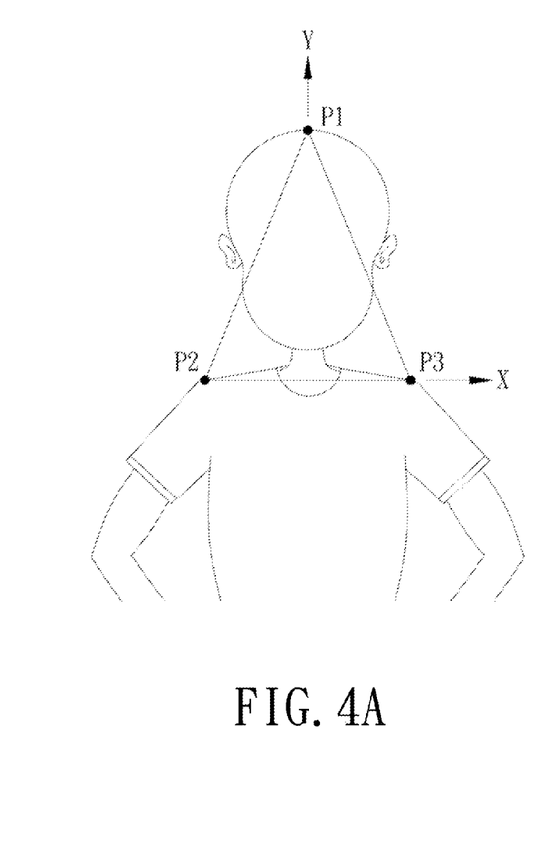
FIG. 4A is a schematic view of the predetermined human feature defined by a triangle formed by a head point and two shoulder points of a human body.
Figure 4B:
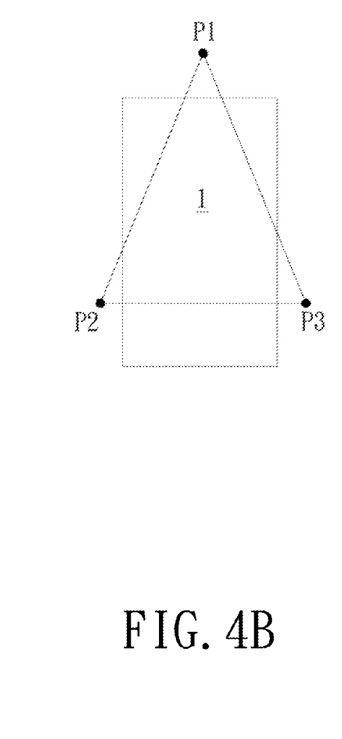
FIGS. 4B and 4C are schematic views illustrating the positions of the head point and the two shoulder points relative to the portable electronic device in vertical and horizontal states, respectively.
Figure 4C:
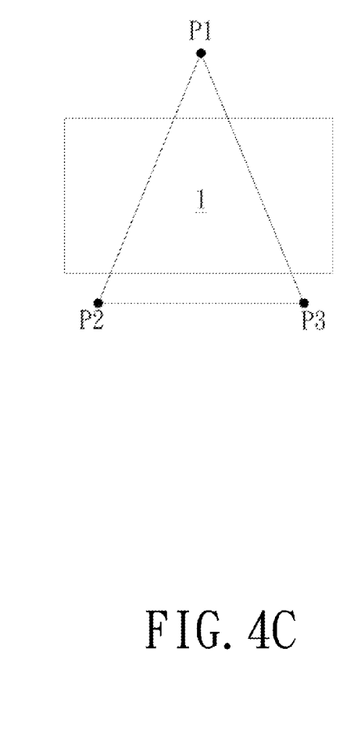

As illustrated in FIG. 4A, the predetermined human feature adopted by the human feature recognition unit 160 is a triangle formed by a head point P1 and two shoulder points P2, P3 of a human body. The connection line of the two shoulder points P2, P3 is the bottom edge of the triangle and the vertical distance (along y-axis) from the connection line of the two shoulder points P2, P3 to the head point P1 is the height of the triangle; however, the present invention is not limited thereto. FIGS. 4B and 4C are schematic views illustrating the positions of the points P1, P2 and P3 relative to the portable electronic device 1 in vertical (along Y-axis) and horizontal states (along X-axis), respectively.

If the determination result from the human feature recognition unit 160 is negative and indicates that no user is detected to exist in front of the portable electronic device 1, the control module 16 does not rotate the image being displayed by the display module 18. Alternatively, if the determination result from the human feature recognition unit 160 is positive, and indicates that there is a detection of a user exists in front of the portable electronic device 1, the control module 16 determines whether or not to rotate the image being displayed by the display module 18 of the portable electronic device 1 according to some specific sensing results such as, the moving speed of the portable electronic device 1, the distance change between an object and the portable electronic device 1 and the angle formed between the portable electronic device 1 and a horizontal direction.

In addition, the triangle formed by the head point P1 and the two shoulder points P2, P3 may be further used for determining whether the angle formed between the user and the portable electronic device 1 is changed or not; in other words, the triangle can be used to determine whether the portable electronic device 1 is tilted relative to the user.

Figure 5A:
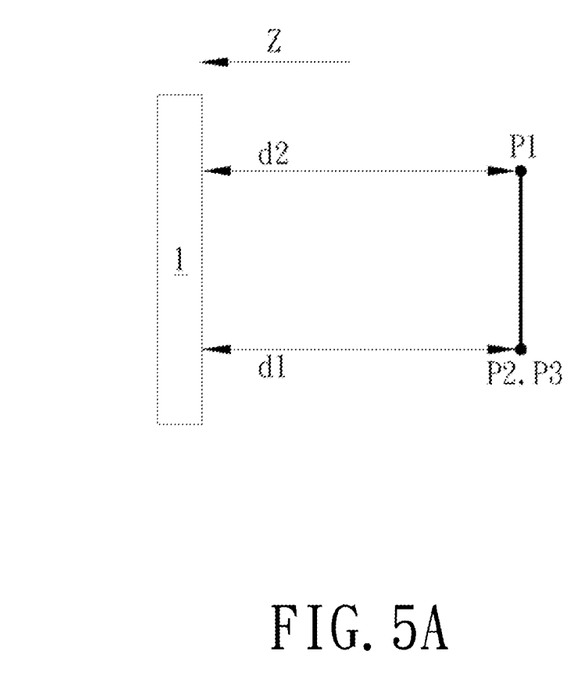
FIG. 5A is a schematic view illustrating that the distance between the head point of a user and the portable electronic device is equal to the distance between the two shoulder points and the portable electronic device.
Figure 5B:
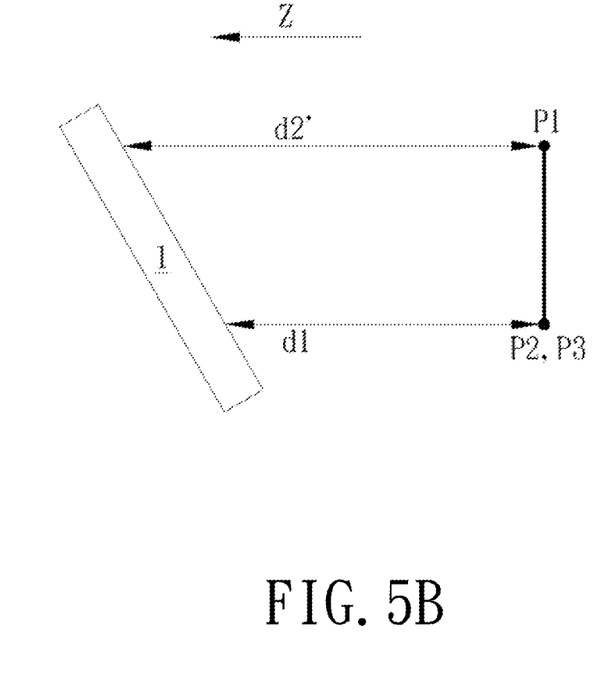
FIG. 5B is a schematic view illustrating that the distance between the head point of a user and the portable electronic device is greater than the distance between the two shoulder points and the portable electronic device.

For example, as illustrated in FIGS. 5A and 5B, the distance d2 between the head point P1 of a user and the portable electronic device 1 is equal to the distance d1 between the two shoulder points P2, P3 and the portable electronic device 1 at a first time point (FIG. 5A). Then, at a second time point, because the portable electronic device 1 is inclined rearward, the distance between the two shoulder points P2, P3 and the portable electronic device 1 is still d1 and the distance between the head point P1 of the user and the portable electronic device 1 increases from d2 to d2' (FIG. 5B). The distances d1, d2, d2' are parallel along Z-axis as shown in FIG. 5B.

A control method of a portable electronic device is provided according to another preferred embodiment of the present invention. In a practical application, the control method is used to control an operation of the portable electronic device. In one embodiment, the portable electronic device may be a smart phone, tablet computer or any other types of electronic devices with image display function, and the present invention is not limited thereto.

Figure 6:
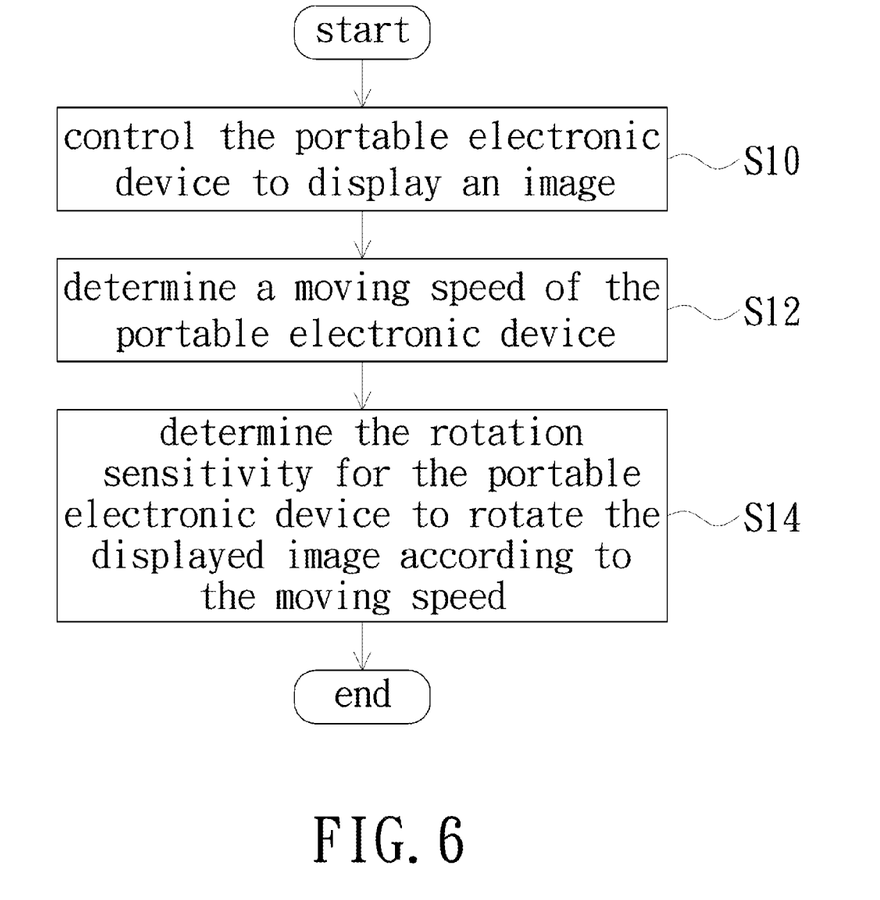
FIG. 6 is a flowchart of a control method of a portable electronic device in accordance with an embodiment of the present invention.

Please refer to FIG. 6, which is a flowchart of a control method of a portable electronic device in accordance with an embodiment of the present invention. As shown in FIG. 6, first, the portable electronic device is controlled to display an image (step S10). Next, a moving speed of the portable electronic device is determined (step S12). In one embodiment, the control method receives a positioning signal (such as the global positioning system (GPS) signal, but the present invention is not limited thereto) at different times and determines the moving speed of the portable electronic device according to the positioning signals received at different times.

Next, the rotation sensitivity for the portable electronic device to rotate the displayed image is determined according to the moving speed of the portable electronic device as determined in step S12 (step S14). In other words, the control method of the embodiment of the present invention can automatically adjust the degree of the rotation sensitivity of the displayed image according to the moving speed of the portable electronic device itself; however, the present invention is not limited thereto.

Figure 7A:
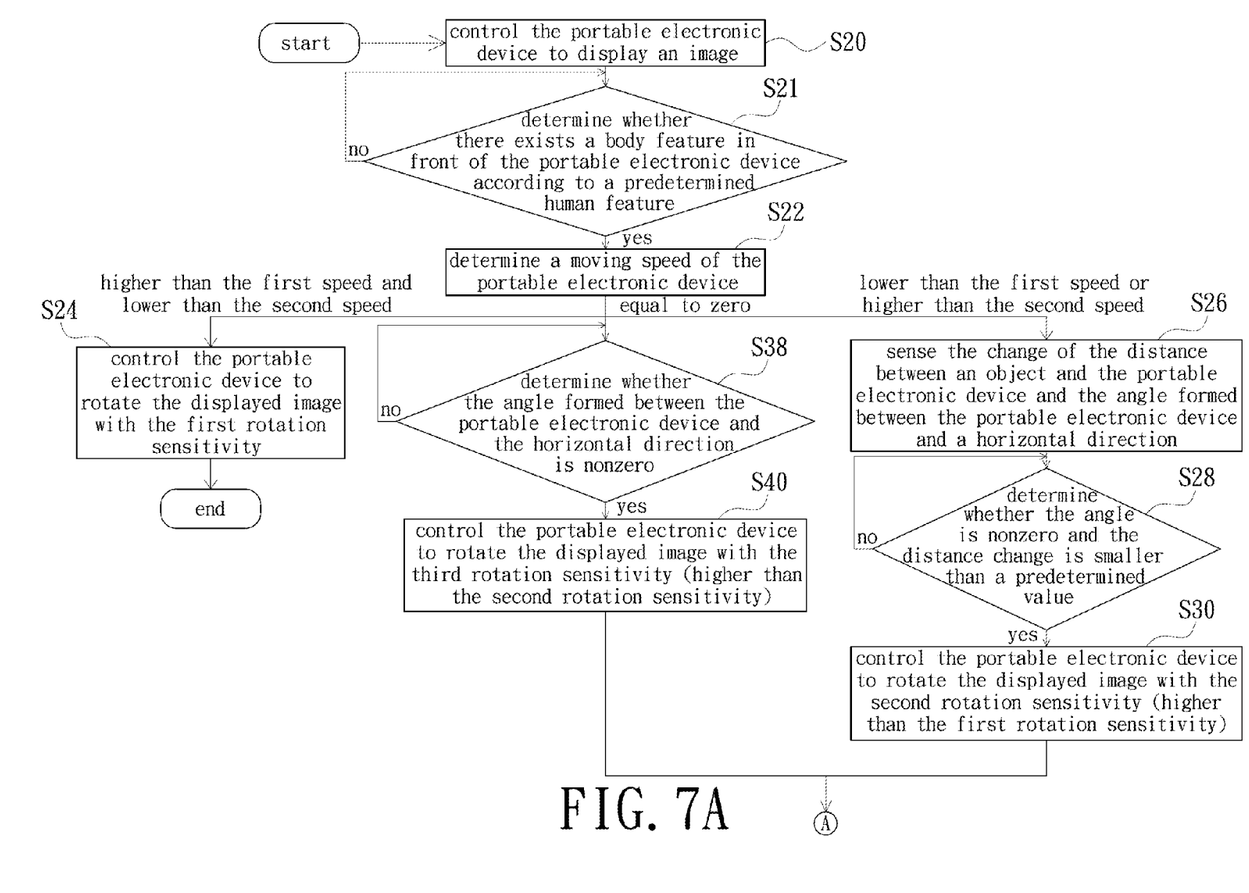
FIGS. 7A and 7B are flowcharts of a control method of a portable electronic device in accordance with another embodiment of the present invention.
Figure 7B:
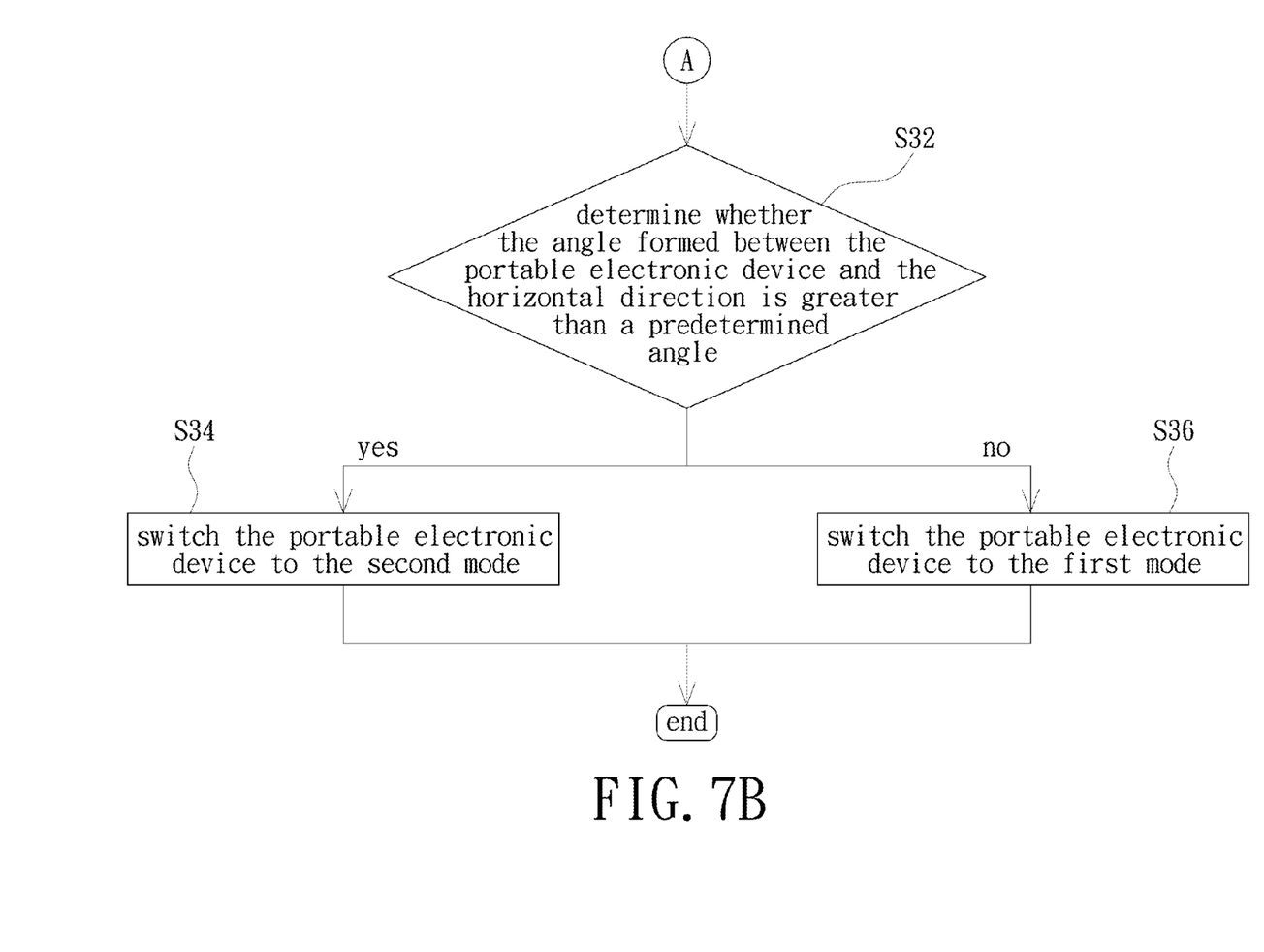

Please refer to FIGS. 7A and 7B, which are flowcharts of a control method of a portable electronic device in accordance with another embodiment of the present invention. As shown in FIG. 7A, first, the portable electronic device is controlled to display an image (step S20). Next, whether or not there exists a human figure in front of the portable electronic device is determined according to a predetermined human feature (step S21). If the determining result obtained in step S21 is Yes and indicates that there is a user in front of the portable electronic device, a moving speed of the portable electronic device is determined (step S22).

To get a better understanding of the present invention, the implementation process of the control method of the illustrated embodiment will be described by some exemplary scenarios as follow. In the first scenario, when the moving speed of the portable electronic device determined in step S22 is higher than a first speed (e.g., 5 km/h) and lower than a second speed (e.g., 15 km/h), it is determined that the user with the portable electronic device is in a walking state due to the fact that the current moving speed of the portable electronic device is substantially equal to the walking speed of an average person (e.g., 5 to 15 km/h). Thus, there is no need to further determine whether the user is in sitting or lying down state. Then, the rotation sensitivity is set to a first rotation sensitivity (the lowest rotation sensitivity) for the portable electronic device to rotate the displayed image with the first rotation sensitivity (step S24); thus, the rotation of the image displayed by the portable electronic device is less sensitive to the movement of the portable electronic device in the first scenario.

In the second scenario, when the moving speed of the portable electronic device as determined in step S22 is lower than the first speed (e.g., 5 km/h) or higher than the second speed (e.g., 15 km/h), it is determined that the user with the portable electronic device is in a non-walking state due to the fact that the current moving speed of the portable electronic device is not substantially equal to the walking speed of an average person (e.g., 5 to 15 km/h). Later, some specific sensing results such as the distance change between an object and the portable electronic device and the angle formed between the portable electronic device and a horizontal direction are then obtained (step 26).

In the present embodiment, the distance sensing mechanism for sensing the distance between the object and the portable electronic device in step S26 is not limited. In one embodiment, for example, optical or ultrasound mechanisms may be used in the control method to measure the distance between the object and the portable electronic device by emitting an emission signal and receiving a reflection signal which is derived from the emission signal reflected by the object. In addition, the mechanism for sensing the angle formed between the portable electronic device and the horizontal direction is not limited in the present embodiment. In one embodiment, the control method may adopt g-sensor or Gyro meter for the angle sensing; however, the present invention is not limited thereto.

Next, whether or not the angle formed between the portable electronic device and the horizontal direction as sensed in step S26 is nonzero and whether or not the distance change between the object and the portable electronic device as sensed in step S26 is smaller than a predetermined value are determined (step S28).

Next, the rotation sensitivity is set to a second rotation sensitivity (higher than the first rotation sensitivity) for the portable electronic device to rotate the displayed image with the second rotation sensitivity if the determining result obtained in step S28 is Yes and indicates that the angle is nonzero and the distance change is smaller than the predetermined value (step S30).

Next, as shown in FIG. 7B, whether or not the angle formed between the portable electronic device and the horizontal direction is greater than a predetermined angle (e.g., 90 degrees) is determined (step S32). If the determining result obtained in step S32 is Yes and indicates that the angle is greater than the predetermined angle, such as the angle M2>90 degrees as illustrated in FIG. 3B, the portable electronic device is switched to a second mode (e.g., a lying down mode) (step S34). Alternatively, if the determining result obtained in step S32 is No and indicates that the angle is not greater than the predetermined angle, such as the angle M1=90 degrees as illustrated in FIG. 3A, the portable electronic device is then switched to a first mode (e.g., a sitting mode) (step S36).

In the third scenario, when the moving speed of the portable electronic device determined in step S22 is zero, whether or not the angle formed between the portable electronic device and the horizontal direction is nonzero is determined (step S38). If the determining result obtained in step S38 is Yes and indicates that the angle is nonzero, the rotation sensitivity is set to a third rotation sensitivity (the highest rotation sensitivity which is higher than the second rotation sensitivity) for the portable electronic device to rotate the displayed image with the third rotation sensitivity (step S40).

Similarly, after step S40 is performed, whether or not the angle formed between the portable electronic device and the horizontal direction is greater than a predetermined angle (e.g., 90 degrees) is determined (step S32). If the determining result obtained in step S32 is Yes and indicates that the angle is greater than the predetermined angle such as the angle M2>90 degrees as illustrated in FIG. 3B, the portable electronic device is switched to the second mode (e.g., the lying down mode) (step S34). Alternatively, if the determining result obtained in step S32 is No and indicates that the angle is not greater than the predetermined angle such as the angle M1=90 degrees as illustrated in FIG. 3A, the portable electronic device is switched to the first mode (e.g., the sitting mode) (step S36).

In summary, compared with the prior art, the portable electronic device and the control method thereof of the present invention can automatically adjust the rotation sensitivity of the image being displayed by the portable electronic device according to the motion state and using mode of a user. Thus, the requirements of users watching the portable electronic device under various motion states and using modes are satisfied. In addition, because the rotation sensitivity is properly adjusted, too high or too low rotation sensitivity is avoided and a user is prevented from having to manually adjust the angle of the portable electronic device while watching or viewing the portable electronic device.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A portable electronic device, comprising:
 a display module for displaying an image;
 a speed sensor for determining a moving speed of the portable electronic device;
 a control module, coupled to the speed sensor and the display module, for determining a rotation sensitivity for the control module to rotate the displayed image according to the moving speed of the portable electronic device;
 a distance sensor, coupled to the control module, for determining a distance change between an object and the portable electronic device; and
 an angle sensor, coupled to the control module, for determining an angle of the portable electronic device with respect to a reference direction,
 wherein the control module rotates the displayed image with a first rotation sensitivity when the moving speed of the portable electronic device is higher than a first speed and lower than a second speed,
 wherein when the moving speed of the portable electronic device is lower than the first speed or higher than the second speed, the control module determines the rotation sensitivity according to the distance change and the angle.

2. The portable electronic device according to claim 1, wherein when the moving speed of the portable electronic device is lower than the first speed, the control module rotates the displayed image with a second rotation sensitivity if the angle is nonzero and the distance change is smaller than a predetermined value, wherein the second rotation sensitivity is higher than the first rotation sensitivity.

3. The portable electronic device according to claim 2, wherein the control module switches the portable electronic device to a first mode when the angle is smaller than or equal to a predetermined angle, when the angle is greater than the predetermined angle, the control module switches the portable electronic device to a second mode.

4. The portable electronic device according to claim 2, wherein when the moving speed of the portable electronic device is zero, the control module rotates the displayed image with a third rotation sensitivity, if the angle is nonzero, wherein the third rotation sensitivity is higher than the second rotation sensitivity.

5. The portable electronic device according to claim 1, wherein when the moving speed of the portable electronic device is higher than the second speed, the control module rotates the displayed image with a second rotation sensitivity if the angle is nonzero and the distance change is smaller than a predetermined value, wherein the second rotation sensitivity is higher than the first rotation sensitivity.

6. The portable electronic device according to claim 5, wherein the control module switches the portable electronic device to a first mode when the angle is smaller than or equal to a predetermined angle, when the angle is greater than the predetermined angle, the control module switches the portable electronic device to a second mode.

7. The portable electronic device according to claim 1, wherein the distance sensor comprises:
　a first ultrasonic emitting unit, disposed on a front surface of the portable electronic device, for emitting a first ultrasonic emission signal from the front surface of the portable electronic device;
　a second ultrasonic emitting unit, disposed on a back surface of the portable electronic device, for emitting a second ultrasonic emission signal from the back surface of the portable electronic device;
　a first ultrasonic receiving unit for receiving a first ultrasonic reflection signal formed by the reflected first ultrasonic emitting signal and accordingly obtaining a front-image state; and
　a second ultrasonic receiving unit for receiving a second ultrasonic reflection signal formed by the reflected second ultrasonic emitting signal and accordingly obtaining a back-image state.

8. The portable electronic device according to claim 7, wherein the control module further comprises:
　a human feature recognition unit, coupled to the first ultrasonic receiving unit, for determining whether there exists a human figure in the front-image state according to a predetermined human feature,
　wherein the control module controls the image not to rotate if it is determined that there is no human figure in the front-image state.

9. The portable electronic device according to claim 8, wherein the predetermined human feature is a triangle formed by a head point and two shoulder points of a human body, a connection line of the two shoulder points is a bottom edge of the triangle and a vertical distance from the connection line of the two shoulder points to the head point is a height of the triangle.

10. A control method of a portable electronic device, comprising steps of:
　(a) controlling the portable electronic device to display an image;
　(b) determining a moving speed of the portable electronic device; and
　(c) determining a rotation sensitivity for the portable electronic device to rotate the displayed image according to the moving speed (d) determining a distance change between an object and the portable electronic device;
　(e) determining an angle with respect to a reference direction of the portable electronic device; and
　(f) determining the rotation sensitivity of the image according to the distance change and the angle when the moving speed of the portable electronic device is lower than the first speed or higher than the second speed,
　wherein when the step (b) determines that the moving speed of the portable electronic device higher than a first speed and lower than a second speed, the step (c) sets the rotation sensitivity to a first rotation sensitivity for the portable electronic device to rotate the displayed image with the first rotation sensitivity,
　wherein when the moving speed of the portable electronic device is lower than the first speed, the displayed image is controlled to rotate according to a second rotation sensitivity if the angle is nonzero and the distance change is smaller than a predetermined value, wherein the second rotation sensitivity is higher than the first rotation sensitivity.

11. The control method according to claim 10, further comprising steps of: switching the portable electronic device to a first mode if the angle is smaller than or equal to a predetermined angle; and
　switching the portable electronic device to a second mode if the angle is greater than the predetermined angle.

12. The control method according to claim 10, wherein when the moving speed of the portable electronic device is higher than the second speed, the displayed image is controlled to rotate according to a second rotation sensitivity if the angle is nonzero and the distance change is smaller than a predetermined value, wherein the second rotation sensitivity is higher than the first rotation sensitivity.

13. The control method according to claim 12, further comprising steps of:
　switching the portable electronic device to a first mode if the angle is smaller than or equal to a predetermined angle; and
　switching the portable electronic device to a second mode if the angle is greater than the predetermined angle.

14. The control method according to claim 10, wherein when the moving speed is zero, the displayed image is controlled to rotate according to a third rotation sensitivity if the angle is nonzero, wherein the third rotation sensitivity is higher than the second rotation sensitivity.

15. The control method according to claim 10, wherein the step (d) comprises sub-steps of:
　emitting a first ultrasonic emission signal and a second ultrasonic emission signal from a front surface and a back surface of the portable electronic device, respectively; and
　receiving a first ultrasonic reflection signal, formed by the reflected first ultrasonic emitting signal, and a second ultrasonic reflection signal, formed by the reflected second ultrasonic emitting signal, to obtain a front-image state and a back-image state, respectively.

* * * * *